United States Patent
Li

(10) Patent No.: US 11,818,469 B2
(45) Date of Patent: Nov. 14, 2023

(54) IRREGULAR SHAPED DISPLAY AND PHOTOGRAPHY SUPPLEMENTAL LIGHTING METHOD

(71) Applicant: WUHAN CHINA STAR OPTOELECTRONICS SEMICONDUCTOR DISPLAY TECHNOLOGY CO., LTD., Wuhan (CN)

(72) Inventor: Jihui Li, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 53 days.

(21) Appl. No.: 16/631,549

(22) PCT Filed: Sep. 6, 2019

(86) PCT No.: PCT/CN2019/104625
§ 371 (c)(1),
(2) Date: Jan. 28, 2022

(87) PCT Pub. No.: WO2020/258520
PCT Pub. Date: Dec. 30, 2020

(65) Prior Publication Data
US 2023/0199321 A1    Jun. 22, 2023

(30) Foreign Application Priority Data

Jun. 25, 2019 (CN) .......................... 201910553987.2

(51) Int. Cl.
*H04N 23/74* (2023.01)
*H04N 23/71* (2023.01)
*H04N 23/57* (2023.01)

(52) U.S. Cl.
CPC ............. *H04N 23/74* (2023.01); *H04N 23/57* (2023.01); *H04N 23/71* (2023.01)

(58) Field of Classification Search
CPC ......... H04N 23/74; H04N 23/71; H04N 23/57
See application file for complete search history.

(56) References Cited

U.S. PATENT DOCUMENTS 10,924,650 B2 *   2/2021   Yang ...................... H04N 23/57
2016/0203742 A1 *  7/2016   Peterson ................ H04N 23/60
                                                          362/23.19

(Continued)

FOREIGN PATENT DOCUMENTS

CN       103312986 A    9/2013
CN       205864557 U    1/2017

(Continued)

*Primary Examiner* — Amy R Hsu
(74) *Attorney, Agent, or Firm* — Dickinson Wright PLLC

(57) ABSTRACT

An irregular shaped display screen includes a non-display region, a display region, a front camera, and a local light enhancement region. The non-display region is disposed around the irregular shaped display screen. The display region is disposed at a middle position of the irregular shaped display screen. The front camera is disposed in the display region. The local light enhancement region is disposed in the display region and a periphery of the front camera.

16 Claims, 2 Drawing Sheets

(56) References Cited

U.S. PATENT DOCUMENTS

| | | | |
|---|---|---|---|
| 2017/0287992 A1 | 10/2017 | Kwak et al. | |
| 2018/0324286 A1* | 11/2018 | Cheng | H04N 23/57 |
| 2019/0174055 A1* | 6/2019 | Srivastava | H04N 23/62 |
| 2019/0258140 A1* | 8/2019 | Li | H04N 23/74 |
| 2020/0314295 A1* | 10/2020 | Nicholson | G09G 3/20 |
| 2021/0297563 A1* | 9/2021 | Manea | H04N 23/57 |
| 2022/0116546 A1* | 4/2022 | Gummadi | G06V 40/20 |

FOREIGN PATENT DOCUMENTS

| | | |
|---|---|---|
| CN | 106502025 A | 3/2017 |
| CN | 107241465 A | 10/2017 |
| CN | 107818733 A | 3/2018 |
| CN | 107911507 A | 4/2018 |
| CN | 108111735 A | 6/2018 |

* cited by examiner

IRREGULAR SHAPED DISPLAY AND PHOTOGRAPHY SUPPLEMENTAL LIGHTING METHOD

FIELD OF INVENTION

The present invention relates to the field of display, and more particularly, to an irregular shaped display screen and a photography supplemental lighting method of a front camera thereof.

DESCRIPTION OF PRIOR ART

With the rapid development of full-screen display technology, more and more screens have adopted boring or opening designs due to presence of a front camera, that is, a part of the screen surrounds the front camera. In practical applications, quality of final image is poor due to low brightness of ambient light in low light or dark light.

Currently, there is also a problem that the front camera of the irregular shaped display screen in the prior art has poor photographing effect due to low brightness of ambient light when photographing, which requires urgent improvement.

Technical Problem

The present invention relates to an irregular shaped display screen for solving the problem that the front camera of the irregular shaped display screen in the prior art has a poor photographing effect due to low brightness of ambient light when photographing.

SUMMARY OF INVENTION

In order to solve the above problems, technical solutions provided by the present invention are described as follows.

An irregular shaped display screen includes a non-display region, a display region, a front camera, and a local light enhancement region.

The non-display region is disposed around the irregular shaped display screen and configured to protect the irregular shaped display screen.

The display region is disposed at a middle position of the irregular shaped display screen, a shape of the display region is rectangular, and the display region is configured to display images.

The front camera is disposed in the display region and configured to photograph.

The local light enhancement region is disposed in the display region and a periphery of the front camera, and the local light enhancement region is controlled by a driving integrated circuit that is disposed in the display region and configured to enhance photographing light when the front camera is used.

In one embodiment, an area of the non-display region is less than an area of the display region.

In one embodiment, a shape of the front camera is circular, rectangular, elliptical, or triangular, and a shape of the local light enhancement region is circular, rectangular, triangular, or elliptical.

In one embodiment, an area of the local light enhancement region is greater than an opening area of the front camera.

In one embodiment, a brightness of the local light enhancement region is greater than a brightness of the display region when the front camera is used to photograph.

A photography supplemental lighting method of a front camera of an irregular shaped display screen includes following steps:

S10, turning the front camera on to obtain a brightness of current ambient light;

S20, comparing the brightness of the current ambient light with a preset value of the irregular shaped display screen;

S30, if the brightness of the current ambient light is not within the preset value range, the irregular shaped display does not turn on a local light enhancement function, so the irregular shaped display does not start to photograph; and S40, if the brightness of the current ambient light is within the preset value range, the driving integrated circuit controls a local light enhancement region to turn on the local light enhancement function and start to photograph.

In one embodiment, a light sensor is disposed in the front camera in step "S10".

In one embodiment, step "S40" further includes:

S401, an algorithm is used to calculate a brightness difference between the brightness of the current ambient light and the preset value of the irregular shaped display screen; and S402, the local light enhancement region compensates for a brightness of the light around the front camera for the brightness difference.

In one embodiment, the brightness of the current ambient light is inversely proportional to the brightness enhanced by the local light enhancement region.

In one embodiment, the front camera, the driving integrated circuit, and the local light enhancement region are electrically connected to form a full closed loop feedback circuit.

Compared with the prior art, the irregular shaped display screen and the photography supplemental lighting method of a front camera of the irregular shaped display screen have the following beneficial effects:

1. An irregular shaped display screen adds a local light enhancement region around the front camera to compensate the brightness of the front camera when photographing in a dark environment, thereby improving the photograph quality.

2. A photography supplemental lighting method of a front camera of an irregular shaped display screen is also provided. Firstly, obtaining the brightness of the current ambient light, and then comparing the brightness of the current ambient light with the preset value of the display screen. Next, an algorithm is used to calculate a brightness difference between the brightness of the current ambient light and the preset value of the display screen, and the brightness of the light around the front camera is compensated for the brightness difference.

BRIEF DESCRIPTION OF DRAWINGS

It is understood that the terminology, specific structural details, and details of the present invention are used for the purpose of describing the specific embodiments and are representative, but the present invention can be embodied in many alternative forms and should not be construed as merely limited by the embodiments set forth herein.

DETAILED DESCRIPTION OF PREFERRED EMBODIMENTS

Figure 1:
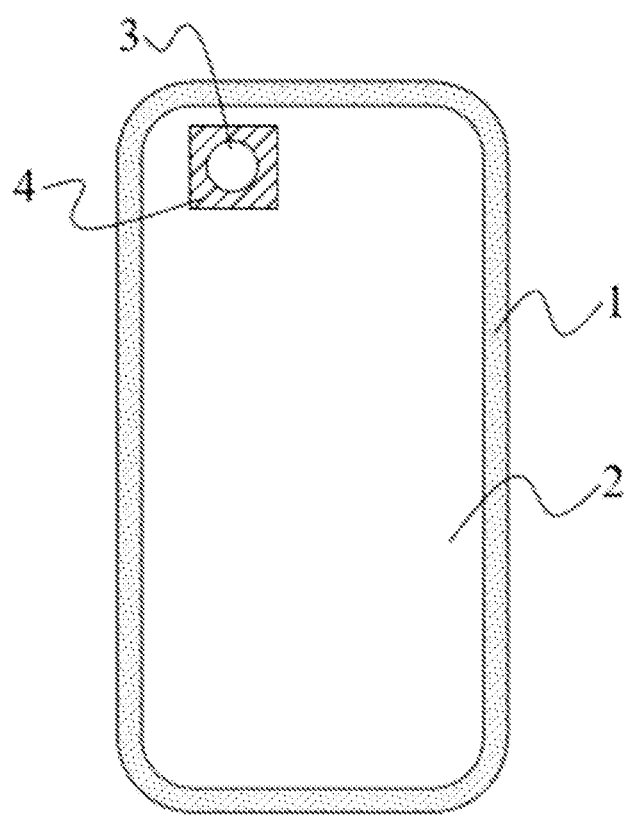
FIG. 1 is a schematic view of a irregular shaped display screen according to one embodiment of the present invention.

It is understood that the terminology, specific structural details, and details of the present invention are used for the purpose of describing the specific embodiments and are representative, but the present invention can be embodied in many alternative forms and should not be construed as merely limited by the embodiments set forth herein.

In addition, the terms of "center," "longitudinal," "transverse," "length," "width," "upper," "lower," "front," "back," "left," "right," "vertical," "horizontal," "top," "bottom," "inside," "outside," "clockwise," and "counterclockwise" are described based on the orientation or relative positional relationship shown in the drawings, and they are used for the convenience of describing the simplified description of the present invention rather than indicating that the device or component referred to have a particular orientation, or constructed and operated in a particular orientation. Therefore, it should not be construed as limiting the present invention. Moreover, the terms "first" and "second" are merely used for descriptive purposes and are not to be construed as indicating or implying a relative importance or implicitly indicating the number of technical features. Thus, features defining "first" or "second" may include one or more of the described features either explicitly or implicitly. In the description of the present invention, the meaning of "a plurality" is two or more unless specifically defined otherwise.

Figure 2:
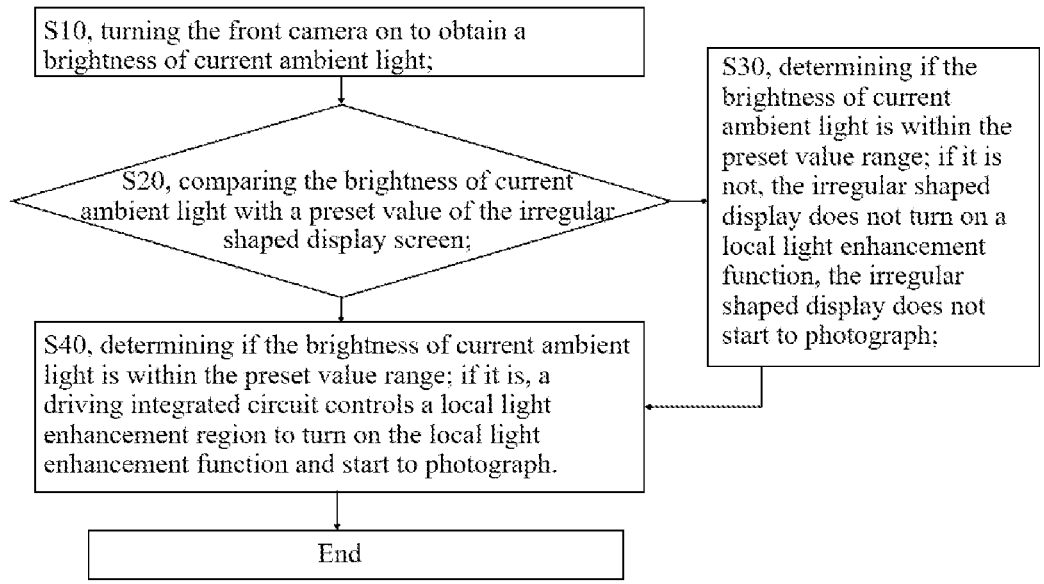
FIG. 2 is a flowchart of a photographing method of a front camera of the irregular shaped display screen according to one embodiment of the present invention.
Figure 3:
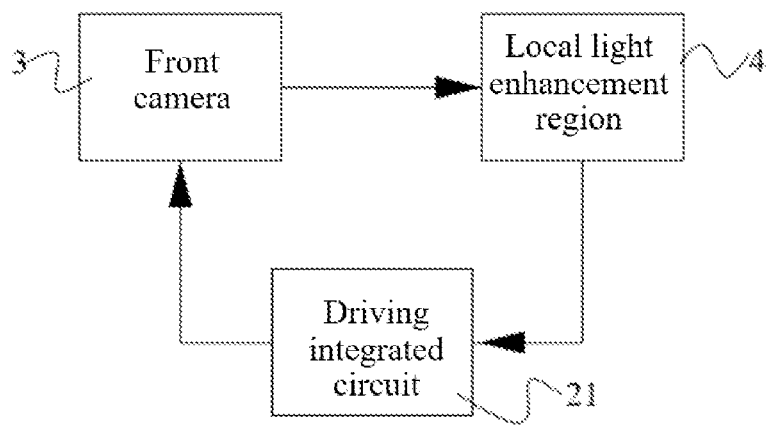
FIG. 3 is a schematic view of internal control of photographic supplementing through the front camera of the irregular shaped display screen according to one embodiment of the present invention.

Specifically referring to FIG. 1 to FIG. 3, an irregular shaped display screen and a photography supplemental lighting method of a front camera of the irregular shaped display screen are provided.

Referring to FIG. 1, it is a schematic view of an irregular shaped display screen according to one embodiment of the present invention. The irregular shaped display screen includes a non-display region 1, a display region 2, a front camera 3, and a local light enhancement region 4. The non-display region 1 is disposed around the irregular shaped display screen and configured to protect the irregular shaped display screen. The display region 1 is disposed at a middle position of the irregular shaped display screen, and the display region 1 is configured to display images. The front camera 3 is disposed in the display region 2 and configured to photograph. The local light enhancement region 4 is disposed in the display region 2 and a periphery of the front camera 3, and the local light enhancement region 4 is controlled by a driving integrated circuit 21 (not shown in the figure) disposed in the display region 2, and configured to enhance the photographing light when the front camera 4 is used.

In one embodiment of the present invention, an area of the non-display region 1 is less than an area of the display region 2. A shape of the front camera 3 is circular, rectangular, elliptical, or triangular, etc., and is not limited to the circular shape shown in the figure. A shape of the local light enhancement region 4 is circular, rectangular, triangular, or elliptical, etc. An area of the local light enhancement region 4 is greater than an opening area of the front camera 3, that is, the front camera 3 is disposed at a central region of the local light enhancement region 4. Furthermore, the front camera 3 is disposed at one corner of the display region 2.

It is not limited to a top left corner shown in FIG. 1 according to the embodiment, and it may be the top right corner, the bottom left corner, or the bottom right corner, etc.

In one embodiment, the local light enhancement region 4 is electrically connected to the driving integrated circuit (DIC) 21 disposed in the display region 2, When the front camera 3 is photographed, a brightness of light around the front camera 3 is increased. Therefore, an amount of light is increased, and the brightness around the front camera 3 is greater than a normal brightness of the display region 2, that is, high brightness mode (HBM) is turned on. That is, a brightness of the local light enhancement region 4 is greater than a brightness of the display region 2 when the front camera 3 is used to photograph. If the brightness of current ambient light is not within the preset value range, the irregular shaped display does not turn on a local light enhancement function, and the irregular shaped display can start to photograph.

Referring to FIG. 2, it is a flowchart of a photographing method of a front camera of an irregular shaped display screen according to one embodiment of the present invention. A photography supplemental lighting method of a front camera of an irregular shaped display screen includes following steps: S10, turning the front camera on to obtain a brightness (Lx) of current ambient light; S20, comparing the brightness of current ambient light with a preset value (U) of the irregular shaped display screen; S30, determining if the brightness of current ambient light is within the preset value range; if it is not, the irregular shaped display does not turn on a local light enhancement function, the irregular shaped display does not start to photograph; and S40, determining if the brightness of current ambient light is within the preset value range; if it is, a driving integrated circuit controls a local light enhancement region 4 to turn on the local light enhancement function and start to photograph. In step "S10," a light sensor (not shown in the figure) is disposed in the front camera 3. The light sensor is mainly used to obtain the brightness of ambient light.

Furthermore, step "S40" further includes S401, an algorithm is used to calculate a brightness difference between the brightness of current ambient light and the preset value of the irregular shaped display screen, that is, calculating the difference; and S402, the local light enhancement region 4 compensates for a brightness of the light around the front camera 3 for the brightness difference, that is, compensating for a brightness of light.

It is known that a relation formula between the brightness enhanced by the local light enhancement region 4 and the brightness of current ambient light is: $Lv=k*Lx$, that is, the brightness of current ambient light is inversely proportional to the brightness enhanced by the local light enhancement region 4.

Referring to FIG. 3, it is a schematic view of internal control of photographic supplementing through the front camera of the irregular shaped display screen according to one embodiment of the present invention. The front camera 3, the driving integrated circuit 21, and the local light enhancement region 4 are electrically connected to form a fully closed loop feedback circuit.

That is, the driving integrated circuit 21 continuously compensates for the brightness of the local light enhancement region 4. If the brightness value of the local light enhancement region 4 does not reach the preset value of the irregular shaped display screen, the local light enhancement region 4 then transmits a signal to the driving integrated circuit 21, and the driving integrated circuit 21 calculates again, and a further brightness value is compensated for the local light enhancement region 4 by the front camera 3, so that it repeats again and again until the brightness of the light enhanced by the local light enhancement region 4 reaches the preset value of the irregular shaped display screen.

Compared with the prior art, an irregular shaped display screen and a photography supplemental lighting method of a front camera of the irregular shaped display screen provided in the present invention have the following beneficial effects. Firstly, the irregular shaped display screen adds a local light enhancement region 4 around a front camera 3 to compensate the brightness of the front camera 3 when photographing in a darker environment, thereby improving the photograph quality. Next, a photography supplemental lighting method of the front camera of the irregular shaped display screen is also provided, wherein the brightness of current ambient light is first obtained, and then the brightness of current ambient light is compared with the preset value of the display screen. Next, an algorithm is used to calculate a brightness difference between the brightness of current ambient light and the preset value of the display screen, and the brightness of light around the front camera is compensated for the brightness difference.

The present application has been described in the above preferred embodiments, but the preferred embodiments are not intended to limit the scope of the invention, and a person skilled in the art may make various modifications without departing from the spirit and scope of the application. The scope of the present application is determined by the claims.

What is claimed is:

1. An irregular shaped display screen, comprising:
   a non-display region;
   a display region;
   a front camera; and
   a local light enhancement region;
   wherein the non-display region is disposed around the irregular shaped display screen and configured to protect the irregular shaped display screen;
   wherein the display region is disposed at a middle position of the irregular shaped display screen, a shape of the display region is rectangular, and the display region is configured to display images;
   wherein the front camera is disposed in the display region and configured to photograph; and
   wherein the local light enhancement region is disposed in the display region and a periphery of the front camera, and wherein the local light enhancement region is controlled by a driving integrated circuit that is disposed in the display region and configured to enhance photographing light when the front camera is used.

2. The irregular shaped display screen according to claim 1, wherein an area of the non-display region is less than an area of the display region.

3. The irregular shaped display screen according to claim 2, wherein a shape of the front camera is circular, rectangular, elliptical, or triangular, and a shape of the local light enhancement region is circular, rectangular, triangular, or elliptical.

4. The irregular shaped display screen according to claim 3, wherein an area of the local light enhancement region is greater than an opening area of the front camera.

5. The irregular shaped display screen according to claim 4, wherein a brightness of the local light enhancement region is greater than a brightness of the display region when the front camera is used to photograph.

6. The irregular shaped display screen according to claim 5, wherein the front camera is disposed at a central region of the local light enhancement region, and the central region of the local light enhancement region is disposed at one corner of the display region.

7. The irregular shaped display screen according to claim 1, wherein the local light enhancement region is electrically connected to the driving integrated circuit disposed in the display region.

8. An irregular shaped display screen, comprising:
   a non-display region;
   a display region;
   a front camera; and
   a local light enhancement region;
   wherein the non-display region is disposed around the irregular shaped display screen and configured to protect the irregular shaped display screen;
   wherein the display region is disposed at a middle position of the irregular shaped display screen, and the display region is configured to display images;
   wherein the front camera is disposed in the display region and configured to photograph; and
   wherein the local light enhancement region is disposed in the display region and a periphery of the front camera, and the local light enhancement region is controlled by a driving integrated circuit is disposed in the display region and configured to enhance the photographing light when the front camera is used.

9. The irregular shaped display screen according to claim 8, wherein an area of the non-display region is less than an area of the display region.

10. The irregular shaped display screen according to claim 9, wherein a shape of the front camera is circular, rectangular, elliptical, or triangular, and a shape of the local light enhancement region is circular, rectangular, triangular, or elliptical.

11. The irregular shaped display screen according to claim 10, wherein an area of the local light enhancement region is greater than an opening area of the front camera.

12. The irregular shaped display screen according to claim 11, wherein a brightness of the local light enhancement region is greater than a brightness of the display region when the front camera is used to photograph.

13. A photography supplemental lighting method of a front camera of an irregular shaped display screen, comprising following steps:
   S10, turning the front camera on to obtain a brightness of current ambient light;
   S20, comparing the brightness of current ambient light with a preset value of the irregular shaped display screen;
   S30, determining if the brightness of current ambient light is within the preset value range; if it is not, the irregular shaped display does not turn on a local light enhancement function, and the irregular shaped display does not start to photograph; and
   S40, determining if the brightness of current ambient light is within the preset value range; if it is, a driving integrated circuit controls a local light enhancement region to turn on the local light enhancement function and start to photograph;
   wherein the front camera, the driving integrated circuit, and the local light enhancement region are electrically connected to form a fully closed loop feedback circuit.

14. The photography supplemental lighting method of the front camera of the irregular shaped display screen according to claim 13, wherein a light sensor is disposed in the front camera in step "S10".

15. The photography supplemental lighting method of the front camera of the irregular shaped display screen according to claim 13, wherein step "S40" further comprises:

S401, using an algorithm to first calculate a brightness difference between the brightness of current ambient light and the preset value of the irregular shaped display screen; and S402, using the local light enhancement region to compensate for a brightness of light around the front camera for the brightness difference.

16. The photography supplemental lighting method of the front camera of the irregular shaped display screen according to claim 15, wherein the brightness of current ambient light is inversely proportional to the brightness enhanced by the local light enhancement region.

* * * * *